Nov. 15, 1949     L. I. GRIFFIN, JR     2,487,867
CATALYST PURIFICATION
Filed July 11, 1945
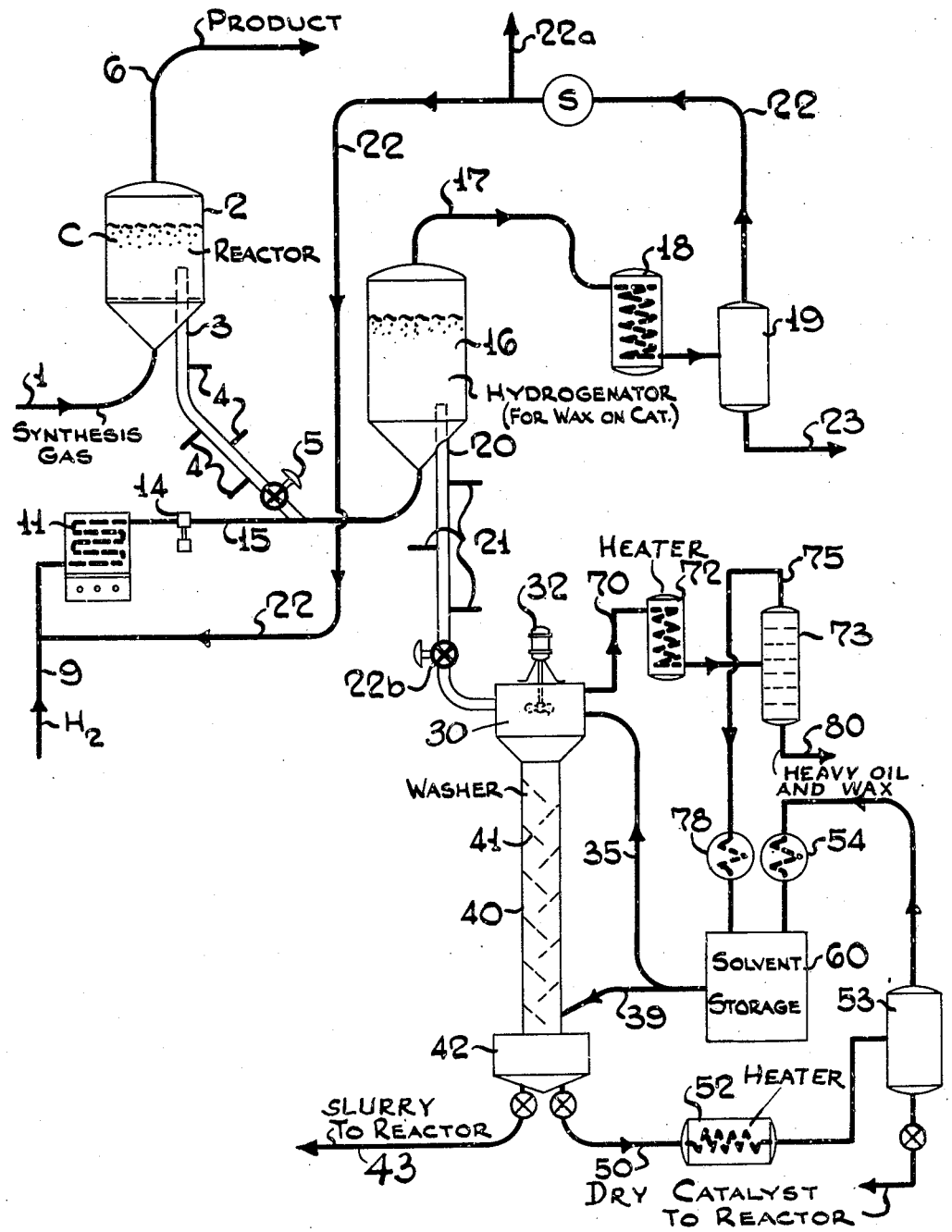
Lindsay I. Griffin, Jr. Inventor
By    _P. L. Young_ Attorney Patented Nov. 15, 1949

2,487,867

UNITED STATES PATENT OFFICE 2,487,867

CATALYST PURIFICATION

Lindsay I. Griffin, Jr., Baton Rouge, La., assignor to Standard Oil Development Company, a corporation of Delaware Application July 11, 1945, Serial No. 604,349

6 Claims. (Cl. 260—449.6)

The normal features of my invention are fully disclosed in the following specification and claims considered in connection with the accompanying drawing.

The object of my invention is to purify and reactivate a catalyst employed in the synthesis of hydrocarbons from CO and hydrogen in an efficient and expeditious manner.

In the synthesis of normally liquid hydrocarbons from CO and hydrogen, there is unavoidably formed on the catalyst a quantity of oily and waxy material which impairs the activity of the catalyst, and therefore, requires periodic treatment of the catalyst to remove said waxy and oily deposits. In brief, my invention involves subjecting such contaminated catalysts to destructive hydrogenation followed by treatment with a wash solvent, all of which will appear more fully and at large hereinafter. The hydrogenation of the contaminants may be readily effected since the metals of the iron group which constitute a part of the hydrocarbon synthesis catalyst are also very effective for the hydrogenation of hydrocarbons.

In the accompanying drawing, I have shown a flow plan which illustrates a preferred method of carrying my improvements into practical effect.

Referring in detail to the drawing, I have shown a hindered settler reactor 2 containing a body of "fluidized" catalyst, that is to say, a mass of powdered catalyst suspended in the reaction gases or vapors. This type of reactor is known in the catalytic cracking art, and the method of its operation need not be fully explained herein, for it does not go to the heart of my invention. It will be sufficient merely to point out that the synthesis gases, consisting of CO and hydrogen properly proportioned, are charged by line 1 to reactor 2 where they contact the catalyst C (which may be cobalt activated by thoria and carried on kieselguhr, or alternatively, it may be an iron catalyst), under proper conditions of temperature and pressure and for a sufficient period of time to effect the desired conversion. Whereupon, a product for recovery is taken off overhead through line 6 and recovered and treated in a known manner. It is indicated during the reaction, that oily and waxy materials form on the catalyst, and according to my invention, I withdraw the powdered catalyst through a bottom drawoff pipe 3 carrying a flow control valve 5. Of course, it will be understood that an equal quantity of catalyst must be fed to the reactor to replace that withdrawn, and this catalyst may be added with the synthesis gas entering through line 1. Referring again to drawoff pipe 3, the same is provided in a known manner with a plurality of taps 4 through which a small quantity of gaseous material such as inert hydrocarbon, portion of the synthesis gas, or the like, may be forced into the downflow stream of catalyst to increase the fluid flow thereof, and to prevent bridging or plugging of the catalyst in the pipe. The catalyst discharges into a stream of hydrogen or hydrogen-containing gas, the latter being introduced through pipe 9, heated in the fired coil 11, and thence pumped by pump 14 through line 15 into line 3 and thence into a hydrogenation reactor 16 wherein it forms a dense suspension of catalyst in the hydrogen-containing gas similar to that in reactor 2. This fluid condition may be achieved, as is known, by regulating the linear velocity of the gasiform material controlled within the limits of ¼ to 10 feet per second, preferably however, from ½ to 3 feet per second. The conditions of temperature and pressure will be set forth hereinafter, but for the present it will simply be stated that the waxy material contained on the catalyst is subjected to known conditions of temperature and pressure for a sufficient period of time to effect a substantial amount of destructive hydrogenation to form certain volatile products which are withdrawn overhead through line 17 and to lower the molecular weight and/or viscosities of the oily material and wax remaining on the catalyst, and also to make it more pervious or porous, so that it will be more adaptable for effective treatment with the wax solvent to remove it from the catalyst. The volatile material in line 17 is forced through a condensing coil 18, and thence discharged into a separation drum 19, from which the hydrogen-containing gas is withdrawn overhead through line 22. Since this gas will be associated normally with hydrocarbon gases, it is advisable to scrub the said gas with a light naphtha or other scrubbing oil in S, for the purpose of dissolving out substantial quantities of the said hydrocarbons, and thus, purifying the hydrogen stream, whereupon the major part of the hydrogen stream is then recycled to line 9 for further use in the process. A minor amount of the gas in line 22 is rejected from the system.

Meanwhile, the catalyst is withdrawn from hydrogenator 16 through a drawoff pipe 20 carrying a flow control valve 22, and also gas introducing leads 21 performing the same function as taps 4 in line 3, and the thus withdrawn catalyst is discharged into a mixer 30 where it is mixed with a solvent for the wax such as, for example, a naphtha fraction, the mixer being provided with a suitably driven mixing means 32 to provide agitation, and therefore, good contact between the liquid solvent and the catalyst. The solvent is introduced through line 35; however, another portion of solvent is introduced into the bottom of an extraction tower 40 through line 39 and passes upwardly against the catalyst which flows downwardly from mixer 30 to a sump or well 42. Thus, the catalyst is subjected to a countercurrent solvent wash. In order to provide more intimate contact between the catalyst and the liquid solvent, extraction tower 40 is provided with a plurality of baffles 41, which cause the catalyst to follow a tortuous path in passing from mixer 30 to sump 42. A slurry of catalyst and solvent is withdrawn from well 42 through line 50, and after heating in 52 is discharged into a separation drum 53 from which the solvent is taken off overhead as a vapor, thence condensed in the coil 54 and returned to solvent storage 60. However, the catalyst may be returned to the reactor 2 in the form of a slurry via valved line 43, in which case, of course, the slurry would not be heated to flash off the solvent to recover a dry catalyst.

The solvent, as indicated, passes up through tower 41 and is withdrawn through line 70, thence passed into a heater 72 and thereafter discharged into a fractional distillation column 73 from which the solvent, substantially free of wax and oily material originally on the catalyst, is recovered overhead through line 75 and cooled in the condenser 78 and returned to solvent storage 60 for further use in the process. The oily and waxy bottoms are rejected from the system through line 80.

Referring again to the separation drum 19, the hydrocarbon bottoms withdrawn through line 23 may be processed to recover valuable hydrocarbons.

In the foregoing description, I have set forth the essentials of an operation in which a powdered catalyst employed in a fluid solids type of operation was purified. Of course, my improvements extend also in their broadest aspect to successive hydrogenation and solvent treatment of any fouled catalyst contaminated with waxy and oil deposits and containing an active hydrogenating constituent, regardless of the physical form of the catalyst or the type of operation in which it is employed. Thus, if reactor 2 were a stationary bed type of reactor where the catalyst in the form of pills, pellets, granules, etc., is supported on a foraminous support of some sort, the catalyst may be purified by periodically discontinuing the productive phase of the process, and thereafter treating the catalyst phase with hydrogen to destructively hydrogenate the deposits on the catalyst, and after that, the catalyst may be treated with a suitable wash solvent to complete the substantial removal of oily and waxy material from the said catalyst.

As to operating conditions during the hydrogenation step, I prefer to operate as follows:

Temp. in °F. using cobalt type catalyst
degrees__ 360 to 500
Press. in lbs./sq. in. (gauge) _____ 0 to 300
Temp. in °F. using iron type catalyst
degrees__ 450 to 750
Press. in lbs./sq. in. (gauge) _____ 25 to 750
Preferred _____ 25 to 350

As to the solvent, any cheap hydrocarbon solvent is satisfactory such as naphtha, gasoline, and liquified normally gaseous hydrocarbons. To recapitulate briefly, my invention involves cleaning and/or reactivating a catalyst employed in hydrocarbon synthesis, which catalyst has become contaminated with waxy and/or oily deposits. The process involves first subjecting the fouled catalyst to a destructive hydrogenation, and thereafter to a solvent treatment. The destructive hydrogenation improves the efficiency of the subsequent solvent treatment for the following reasons:

(1) The pores within the catalyst particle are partially freed of wax by hydrogenation thus making access of solvent into the pores more easily accomplished.

(2) The lowered viscosity and melting point of the wax favors a more rapid solution of the wax in the solvent.

After the catalyst is freed of wax, it may be returned to the reactor in the dry powdered state or it may be returned as a slurry or in any other form that is convenient.

What I claim is:

1. The method of removing continuously and uninterruptedly oily and waxy deposits from a fluidizable solid catalyst selected from a class consisting of iron and cobalt employed in the synthesis of hydrocarbons and oxygenated hydrocarbons from gases containing carbon monoxide and hydrogen in a synthesis reaction zone which comprises continuously removing a catalyst contaminated with said deposits from said fluidized solids hydrocarbon synthesis reaction zone, passing said contaminated catalyst to a hydrogenation zone, maintaining a fluidized bed of said contaminated catalyst in said hydrogenation zone, passing a hydrogen-containing gas upwardly through a dense fluidized bed of said contaminated solids in said zone, maintaining a temperature of from about 450° to about 750° F. and an elevated pressure of up to about 750 pounds per square inch gauge suitable for destructive hydrogenation at these temperatures in said zone, retaining the catalyst in said hydrogenation zone for a sufficient period of time to permit destructive hydrogenation of said deposits on said contaminated catalyst, converting in said hydrogenation zone a portion of said contaminants into destructive hydrogenation products volatile at said hydrogenation temperature and pressure and another portion into destructive hydrogenation products involatile at said hydrogenation temperature and pressure, said latter portion remaining on the catalyst, withdrawing from said zone a catalyst containing said latter portion and being more susceptible to solvent extraction than the contaminated catalyst introduced to said hydrogenation zone, subjecting said withdrawn catalyst to an extraction process in an extraction zone with a low boiling solvent, recovering a catalyst substantially free from oil and wax deposits, and recycling said catalyst to said synthesis zone.

2. The method set forth in claim 1 in which the solvent is a portion of the hydrocarbon synthesis product.

3. The method set forth in claim 1 in which an amount of catalyst is added to the synthesis reaction zone substantially equal to that which is withdrawn.

4. The method set forth in claim 1 in which a volatile material containing unused hydrogen is withdrawn from the hydrogenation zone, subjected to scrubbing to remove at least a portion of carbonaceous material therefrom, and said thus purified hydrogen is recycled to the hydrogenation zone.

5. The method set forth in claim 1 in which catalyst is withdrawn from the hydrogenation zone and charged to a point at near the top of said solvent extraction zone in the form of an aerated column exerting pseudo-hydrostatic force.

6. The method set forth in claim 1 in which the catalyst is treated with a solvent in a countercurrent operation.

LINDSAY I. GRIFFIN, Jr.

REFERENCES CITED

The following references are of record in the file of this patent:

UNITED STATES PATENTS

| Number | Name | Date |
| --- | --- | --- |
| 1,933,508 | Peck | Oct. 31, 1933 |
| 1,954,096 | Pier et al. | Apr. 10, 1934 |
| 2,159,140 | Eckell et al. | May 23, 1939 |
| 2,238,726 | Feisst et al. | Aug. 15, 1941 |
| 2,247,087 | Herbert | June 24, 1941 |
| 2,259,961 | Myddleton | Oct. 21, 1941 |
| 2,367,474 | Stewart | Jan. 16, 1945 |
| 2,414,276 | Sensel et al. | Jan. 14, 1947 |
| 2,414,852 | Burnside et al. | Jan. 28, 1947 |